United States Patent [19]
Liedtke

[11] Patent Number: 5,790,979
[45] Date of Patent: Aug. 4, 1998

[54] TRANSLATION METHOD IN WHICH PAGE-TABLE PROGRESSION IS DYNAMICALLY DETERMINED BY GUARD-BIT SEQUENCES

[76] Inventor: Jochen Liedtke, Am Scherenstueck 30, 53757 St. Augustin, Germany

[21] Appl. No.: 549,731
[22] PCT Filed: May 6, 1994
[86] PCT No.: PCT/EP94/01453
§ 371 Date: Nov. 13, 1995
§ 102(e) Date: Nov. 13, 1995
[87] PCT Pub. No.: WO94/27222
PCT Pub. Date: Nov. 24, 1994

[30] Foreign Application Priority Data

| May 10, 1993 | [DE] | Germany | 43 15 567.7 |
| May 28, 1993 | [DE] | Germany | 43 19 842.2 |
| Feb. 23, 1994 | [DE] | Germany | 44 05 845.4 |

[51] Int. Cl.$^6$ ............................. G06F 12/10
[52] U.S. Cl. ................................. 711/206
[58] Field of Search ............... 395/413, 416, 395/417, 418

[56] References Cited

U.S. PATENT DOCUMENTS

| 3,614,746 | 10/1971 | Klinkhamer et al. | 711/206 |
| 4,654,777 | 3/1987 | Nakamura | 395/416 |
| 4,758,946 | 7/1988 | Shar et al. | 395/416 |
| 4,763,250 | 8/1988 | Keshlear et al. | 711/208 |

OTHER PUBLICATIONS

"MC68030 Enhanced 32-bit Microprocessor User's Manual," 2nd edition, Prentice Hall, Englewood Cliffs, New Jersey, pp. 9–1 through 9–66, 1989.

Tanenbaum, Andrew S. Structured Computer Organization. Prentice Hall, Englewood Cliffs, New Jersey, pp. 348–353, 1990.

Richard Rashid, et al., "Machine–Independent Virtual Memory Management for Paged Uniprocessor and Multiprocessor Architectures", IEEE Transacion on Computers.

"Variable Block Paging For Virtual Memory", IBM Technical Disclosure Bulletin, vol. 27, No. 4B, Sep. 1984.

Primary Examiner—Jack A. Lane
Assistant Examiner—Kevin Verbrugge
Attorney, Agent, or Firm—Akin, Gump, Strauss, Hauer & Feld, LLP

[57] ABSTRACT

The method allows for a simple and fast transformation of virtual addresses of a large fine grained and sparsely occupied address space into real addresses. The transformation is effected in several steps, the reference from step to step being controlled by additionally stored information. Due to this information, the so-called guard, one may depart from the conventional rigid step division. It is possible to skip individual steps on account of the guard, resulting in a shortening of the transformation process by skipping or omitting intermediate steps.

11 Claims, 11 Drawing Sheets

PRIOR ART

TRANSLATION METHOD IN WHICH PAGE-TABLE PROGRESSION IS DYNAMICALLY DETERMINED BY GUARD-BIT SEQUENCES

This application is a 371 of PCT/EP94/01453 filed May 6, 1994.

The present invention refers to a method for mapping a first bit string of a first length onto a second bit string of a second length.

Such a method is particularly applicable for transforming the address of a virtual memory into the address of a real memory in the so-called MMU (Memory Management Unit) of computers with virtual memories.

The virtual to real address transformation is conventionally effected in a multi-step process with the use of so-called page tables. A first table is addressed by means of the first bits of a virtual address and the value stored at this table address is read out. The read out value is the starting address of a second table that is addressed by the next group of bits of the virtual address. Since the groups each comprise a predetermined fixed number of bits that is constant from group to group, this known process runs off in several steps until it eventually arrives on the data storage page, i.e., the real memory, with the final table. The final table gives the data page (also referred to as a page frame). The remaining bit group (last bits of the virtual address) then represents the address (offset) within the data page. This process is time consuming and involves a large data amount, in particular if one imagines address spaces of $2^{64}$-bytes that are sparsely occupied and/or fine-grained. Further, known methods only allow for rather limited variations in the size of data pages, e.g., only data pages of 4 MB and 4 KB in size can be realized simultaneously. However, this often is insufficient since it may be desirable and necessary to be able to provide a plurality of data pages having different sizes.

Modern operating system designs (Mach and L3, for example), the ideas of object orientation with a multitude of small objects, and in particular the increase in processors with large address spaces (64-bit addresses) point out substantial shortcomings of previously available MMUs. Among these shortcomings are the granularity that is too coarse and too uniform for large address spaces, the immense costs for sparsely occupied address spaces ($2^{64}$-byte address spaces are always sparsely occupied) and the insufficient support of hierarchical structures. Address spaces of such size require high-resolution MMUs. High-resolution MMUs must be able to process 64-bit-wide virtual addresses or even wider addresses (128-bit addresses and even wider addresses are possible), they should be able to manage page sizes starting with 8 bytes (8, 16, 32, . . . , 1K, 2K, 4K, . . . ) that should be combinable in the address space, and, for any occupancy of the address space, high-resolution MMUs should require a maximum of 16 to 32 bytes of management information per allocated page (depending on the size of the virtual and the real address space).

Figure 18:
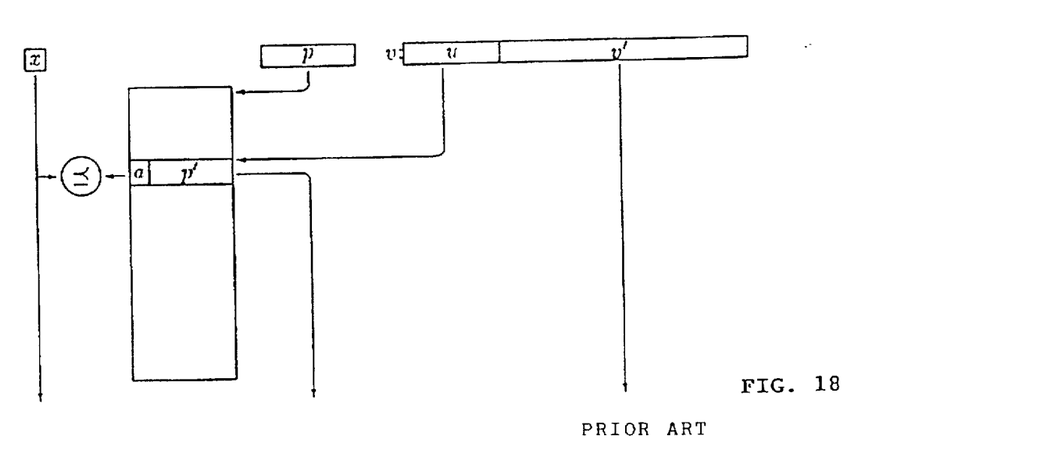
Figure 19:
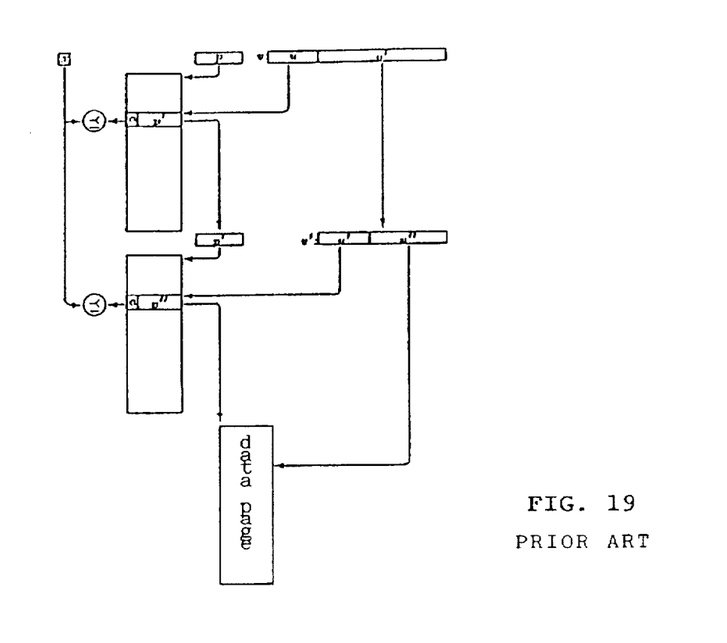

As already stated above, virtual addresses are presently transformed to real addresses in several steps using a tree of individual page tables (the individual tables). Referring now to FIG. 18, we consider a single transformation step of a virtual (binary) address v for an action x by means of a page table with the address p according to the conventional method. For this purpose, v is split into a higher part u (consisting of a specific number of higher bits) and a lower part v' (consisting of the lower bits). Using u, an entry of the page table initially addressed by p. This entry includes an access attribute a and a new address p' as the starting address of the next table or the next page table of the tree. For many computers, actions consist of the read/write or execute operation and the user/kernel mode of operation. The access attributes which permit certain actions (in the extreme case, all actions or none) are constructed correspondingly. The set and semantics of concrete actions access attributes and the method of checking "action against attribute" is irrelevant from the present viewpoint. The crucial point is that it is decided only on account of action x and access attribute a whether to allow or to abort the action. If the access attribute prohibits the action (x>a), transformation is aborted and page fault is signaled. If the action is valid (x≦a), x, p' and v' are passed to the next level transformation as input parameters. It is to be noted that v' is shorter than v by the bit width of u. As soon as the last level is achieved, p' points to the beginning of the data page and v' is the offset within the page. A two-level transformation produces the situation illustrated in FIG. 19. If 64 bit virtual addresses are to be transformed in this way an if the minimum page size is to be 16 bytes, this can be achieved, for example, by means of a ten-level transformation (4 KB per page table). However, sparsely occupied address spaces thus require intolerable management costs. 1024 16-byte pages can be allocated in such a way that 20 KB of management data are necessary per 16 data bytes, which are 0.08% user data. By using a 60-level transformation (8 bytes per page table), management costs decrease to the minimum, namely 400 bytes, which are however still only 4% user data. In addition, a 60-level transformation process would be too time-consuming. If we consider smaller address spaces with 32 bit addresses, for example, the corresponding values are getting better, but they are still intolerable. A 14-level transformation (16 bytes per page table) would thus produce only 8% user data in the worst case.

Figure 20:
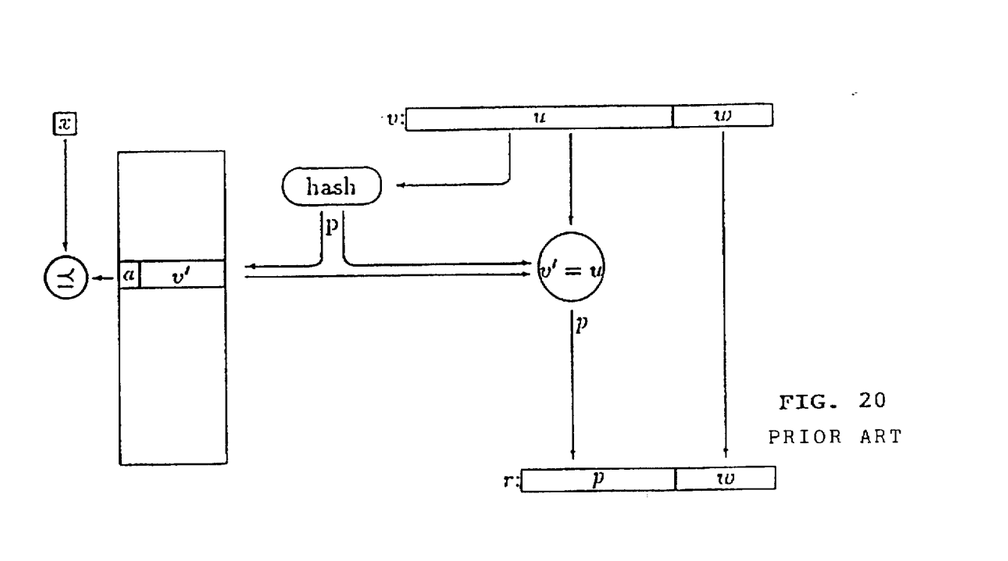

In a further known address transformation method (shortly referred to as Inverted Page Tables), each table consists of one entry per page frame of the real memory which contains the virtual address of the allocated page of the virtual address space. Access is performed with the aid of a hash function. The method is illustrated in FIG. 20. Upon transforming the virtual address v into the real address r, the lower part w is adopted directly. The higher part u is mapped to a value p by means of the hash function, the value p both identifying the presumable page frame in the real memory and serving for indexing the inverted page table. If the corresponding entry contains the correct virtual address u, it is a hit. Otherwise (not shown in FIG. 20) further page frames have to be examined by means of rehashing or linking until getting a hit or a page fault. Since, for inverted page tables, management information depends only on the size of the real memory (and the page size), but not on the size and number of virtual address spaces, space problems do not occur. Nevertheless, three disadvantages make the method useless for fine grained huge address spaces:

1. All pages must be of equal size, i.e. they must be of minimum page size. A mixture of small pages (16 . . . 256 bytes) and medium pages (2 . . . 16 KB) would however be more favourable in almost any case in practice. Several page sizes could be admitted by using a specific hash function and inverted page table for each size.

Without a fixed division of the address space, however, several sizes (in the extreme case all sizes) would have to be tested sequentially upon each address transformation as a rule. On account of the table size, a parallel implementation seems to be hardly possible.

2. In the case of small pages, large real memories and huge address spaces, the used hash function must be extremely good to guarantee a sufficiently high hit rate. Procedures which change the hash function dynamically, such as universal hashing, are likely to be necessary. Hardware and software overhead would be immense.

3. Sharing pages or entire address space regions is not possible. The hierarchical operations (lazy copying, copy on write, mapping, locking) required by modern operating systems are not feasible with acceptable efficiency.

For cost reasons, the page table tree cannot be parsed upon each memory access by a program. This overhead is avoided with the aid of a specific cache for address transformation, a Translation Lookaside Buffer (a so-called TLB—also referred to herein as a mapping unit). Generally, more than 90% of all address transformations are done by TLB hits at no cost. Only in the case of a TLB miss, the page tables are parsed. Conventional TLBs typically hold 32 to 128 entries each of which describing the address transformation of a page. Some of them are fully associative, but often they are only 4-way-associative.

Virtually addressed caches are sometimes used instead of or in addition to these TLBs.

It is the object of the present invention to provide a method for mapping a first bitstring of a first length onto a second bitstring of a second length, which, with a reduced number and/or size of page tables, allows to realize an effective and efficient mapping of a first bitstring onto a second bitstring, in particular in the case of sparsely occupied huge address spaces (small data pages and/or page frames).

The following is, in particular, a description of the functions of an MMU which allows the realization of huge, sparsely occupied address spaces ($2^{54}$ bytes or more) of an as fine as possible granularity with acceptable memory and time cost. The advantages of the previously described tree-like page tables (sharing of subtrees, support of hierarchical operations) are to be maintained. Granularity should not be uniform, i.e. the page size should potentially vary in the address space from position to position. The pages are always aligned, i.e. v mod $2^i$=0 always holds for the virtual starting address v of a page size of $2^i$. A ratio of user data to management information (page tables) of 1:1 is considered to be still acceptable for the extreme case (only pages of minimum size, which are distributed randomly). The ratio should improve drastically with increasing page size. The time cost of conventional MMUs is regarded as acceptable.

The object is solved, according to the invention, by means of a method for mapping a first bitstring of a first length onto a second bitstring of a second length, wherein a) a first memory region with a first starting address (p) and a first length is preset, b) it is checked whether the length of said first memory region is shorter than or equal to 2 to the power of the length of the first bitstring (v) and, if this is the case, the sum of the first starting address (p) of the first memory region and of the first bitstring (v) gives the second bitstring (data page reached), and if said check is negative, the first memory region is used as a first table, and c) bits (u) are selected from specific locations of the first bitstring (v), the unselected remaining bits forming a residual bitstring (w, v'), d) the selected bits (u) of the first bit string (v) specify an entry of the first table.

e) this entry is read out from the first table, f) the starting address (p') and the length of a further memory region and a bit sequence (g) comprising a number of bits are derived from the read-out table entry, g) a number of bits is selected from the residual bit string (w, v'), the number being equal to the number of bits of the bit sequence (g) derived from the table entry of the first table, h) it is checked, whether the sequence of the selected bits of the residual bit string (w, v') is equal to the bit sequence (g) derived from the table entry of the first table, i) in the case of a negative check, a fault signal is generated which indicates that the mapping is not defined for the first bit string (v), k) the bit sequence (g) is extracted from the residual bit string (w, v') if the above check is positive, and l) the method is repeated from step b) using the non-extracted remaining part (v') of the residual bit string (w, v') as the first bit string (v) and the starting address (p') and the length of the further memory region as the starting address (p) and the length of the first memory region.

According to the present method, one starts from a first bit string representing, for example, a virtual address, and maps (transforms, converts or the like) this first bit string onto a second bit string particularly representing the real address. A first memory region with a starting address and a length is specified. If a region with a greater length as that of the first memory region cannot be addressed completely by this first bit string, the second bit string is obtained from the sum of the starting address of the first table and the first bit string, i.e. the sum of the numbers respectively represented by the starting address and the first bit string. In this event, the d at a page has been reached.

The normal case will be that in the first transformation step 2 exponentiated by the length of the first bit string is larger than the length of the first memory region. In this case, the first memory region is a first table used for address transformation, the number of entries in the table usually being a power of 2. Bits are selected from the first bit string at specific locations so that the mapping of the selected bit onto the entries of the first table is unambiguous, i.e. that the number of the selected bits is equal to the logarithm to the base 2 of the number of table entries. The unselected remaining bits of the first bit string form a residual bit string. The selected bits of the first bit string specify the entry of the first table that is to be read out. This entry contains information on the starting address and the length of a further memory region. Furthermore, this entry of the table also holds a bit sequence with a specific bit length. This bit sequence is a data value later also referred to as the "guard". It is then checked whether the residual bit string starts with this bit sequence, for example. If this is the case, a fault signal is issued that indicates that the mapping is not defined. A positive check, however, will cause the residual bit string to be "shortened", i.e. the head bits are cut off in this example. Then, the process will start anew, the remaining part of the residual bit string being used as the new first bit string and the starting address, as well as the length of their memory region are taken as the starting address and the length of the new first memory region.

According to a variant of the method, the residual bit string is permutated prior to being checked for containing the guard, whereafter it may possibly be (re-)permutated.

The main idea of the invention is mirrored by the fact that a table is not only provided with the starting address for the table of the next level or the data page, but also with a value (referred to as guard) in the form of the bit sequence that indicates how many (and possibly which) bits are cut off from the residual bit strings, in order to use the head bits of the remaining, not cut-off part of the residual bit strings to address the next memory region (table or data page), the starting address of which is contained in the read-out entry of the previous table, and to read out the entry of the table address thus specified. A fault signal indicating that the transformation is not defined or not possible is always generated when the bit sequence representing the guard is not contained in the residual bit string of the first bit string or in the first bit string itself. The longer the guard, the fewer transformation levels (cycles) are required.

Advantageously, the first bits of the first bit string are used to specify the address to be read out from the first table out. Preferably, also the guard is compared to the first bits of the remaining residual bit string for identity. Other bits than the first bits may be used in both cases.

An advantageous embodiment of the invention is mentioned in claim 4. In this case, the identical mapping is considered as a special case of permutation.

Finally, it would be advantageous to modify the method of the present invention such that per transformation step several guards are checked as to whether their respective bit sequence is contained in the respective residual bit string. This embodiment is mentioned in claim 5. Thus, an increase in transformation speed or a reduction of the memory size necessary for the tables is achieved. If one were to call the previously described inventive method "(simple) guarded page tables", the method of claim 5 would concern "k-associative guarded page tables", k indicating the number of guard bit sequences to be compared per transformation step.

The features of further advantageous embodiments of the invention are mentioned in the other subclaims.

The following is a detailed description of embodiments of the invention, taken in conjunction with the drawings. The figures show.

Figure 1:
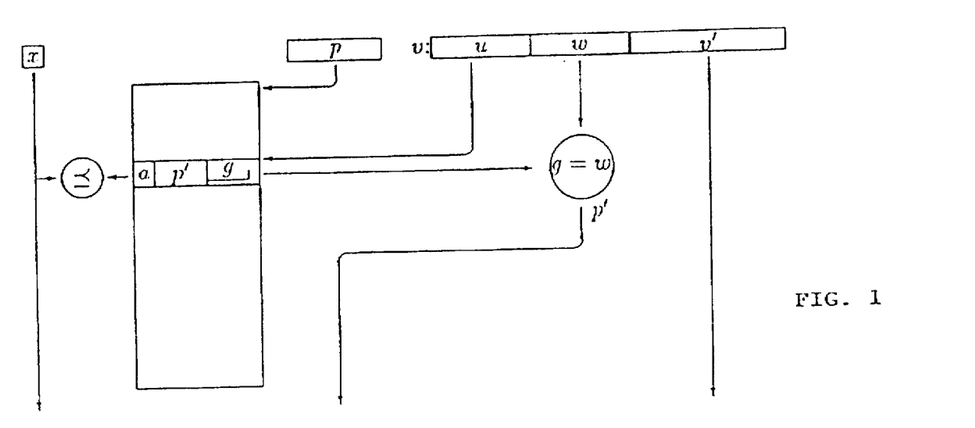
FIG. 1—an illustration of a transformation step of the present method according to the embodiment as "simple guarded page tables", FIG. 2—an example of three binary page tables each having two entries in a 20-bit address transformation with the use of the method of FIG. 1, FIG. 3—an illustration of a transformation step of the present method according to the embodiment as "k-associative guarded page tables", FIG. 4—the method of the present invention in its embodiment with "k/j-associative guarded page tables", FIG. 5—the method of FIG. 4, yet with a stored pointer element, FIG. 6—a schematic illustration of the implementation of a plurality of successive TLBs (referred to in the claims as mapping unit) to be executed in the "guarded page table" method, FIG. 7—an implementation for a cache with a $TLB_0$ function, FIG. 8—a first alternative of an implementation for the element denoted as $TLB_1$ in FIG. 6, FIG. 9—a second alternative of an implementation for the function denoted as $TLB_1$ in FIG. 6, FIG. 10—an illustration of a transformation step of the present method according to a further embodiment (user level mapping), FIG. 11—a schematic illustration of a part of the tree structure for explaining the execution thereof according to the method of FIG. 10, FIG. 12—an illustration of the conventional "real" aliasing for explaining the difference between this method and the one of FIGS. 10 and 11, FIG. 13—an illustration of a transformation step according to another embodiment of the invention, FIG. 14—an illustration of the execution of a transformation step according to another embodiment of the invention, FIG. 15—a first alternative of a hardware implementation of the translator of a MMU according to the invention, FIG. 16—a second alternative of a hardware implementation of the translator of a MMU according to the invention, FIG. 17—a third alternative of a hardware implementation of the translator of a MMU according to the invention, FIG. 18—an illustration of a transformation step of the conventional page table method, FIG. 19—a graphic representation of the conventional page table method as a two-level method, and FIG. 20—an illustration of a transformation step of the conventional method with "inverted page tables".

With reference to FIG. 1, the following is an explanation of the execution of a transformation step according to the method using simple guarded page tables.

The central idea of guarded page tables is the supplementation of each page table entry by a bit sequence g of variable length which is referred to as guard. First a page table entry of a page table with the starting address p is selected by the highest part u of the virtual address upon each transformation step in the same way as with the conventional method, and the action x is examined against the access attribute a. However, the selected entry contains not only access attribute and pointer (starting address) for the next table, but also a further bit sequence, the so-called guard g. By means of the current length of g, the remaining virtual address is split into a higher part w (of equal length as g) and a lower part v'. Then, it is checked whether g=w holds. In the case of inequality, the transformation is aborted with page fault, in the case of equality, it is continued with x, p' and v' in the next level or p'+v' is delivered by the next level as a real address.

It is to be noted that the length of the guards may differ from entry to entry. Their current length is therefore contained in the page table entry and is coded as a length field or in another suitable way. For guards of the length 0 (g=∅), the method works just as the conventional one. But in all cases where conventional page tables with exactly one occupied entry are required, a guard can be used instead. A guard can even replace a sequence of such page tables that contain only one valid entry, respectively. This saves both memory capacity and transformation steps, i.e. guards act as a short cut.

Figure 2:
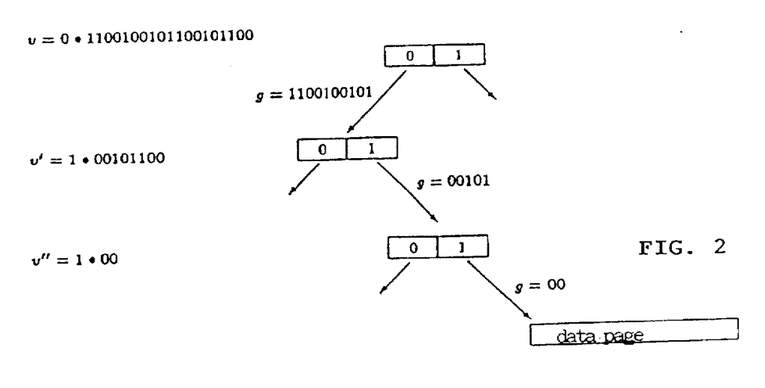

As an example, FIG. 2 illustrates the transformation of a 20-bit address which uses three binary page tables (2 entries per table). Further, each page table entry contains not only the pointer to the next level page table or data page (in the part denoted by p), but in addition a size specification s for this object. In the case of page tables, s refers to the number of entries; all powers of 2, i.e. 1, 2, 4, 8 . . . , are admissible. The length of u is obtained from the current page table size. One can show that on account of the above flexible tree structure, page table trees can be constructed by means of guards in such a way that a maximum of two page table entries is required per data page, independently of address space size and page size.

Together with the data pages varying in size, more than 50% user date should be thus attainable in almost all cases. With 8 bytes per page table entry, guards of a maximum length of 30 bits can be used. A maximum of 16 bytes of management information per page are thus necessary for 32-bit addresses. 64-bit addresses might need longer guards in some cases, then they are realized by an additional entry of 8 bytes. In the worst case (never more than one page per $2^{31}$ bytes and only 16-byte pages), 40% of the data will be user data.

As also shown, address transformation trees can be constructed such that a maximum of n/2 levels is necessary for an n-bit address transformation without exceeding the above storage requirements. Consequently, a maximum of 30 levels is necessary for 64-bit addresses, for 32-bit addresses a maximum of 14 levels, to obtain 16-byte pages.

Figure 3:
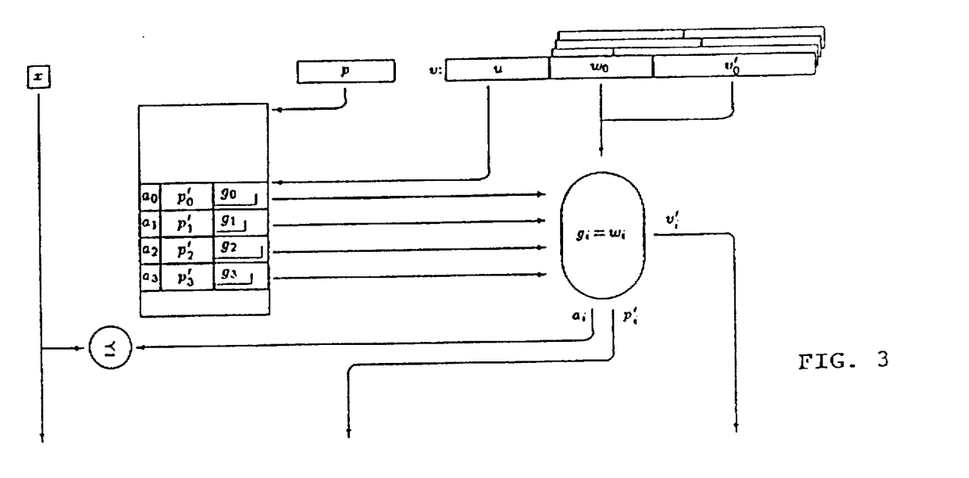

FIG. 3 illustrates a transformation step of the method using k-associative guarded page tables. In the case of k-associative guarded page tables, not one page table entry is selected in each step, but k entries. For the highest possible speed, k parallel units and parallel data paths for k page table entries are needed. The page table does not consist anymore of s simple entries, but of s/k clusters which consist of k simple entries each. u is correspondingly shorter and selects a cluster. If k>s holds for a page table, k is reduced for this transformation step, i.e. one works only in an s-associative way. With k=4, the situation illustrated in FIG. 3 is obtained. Here, the four selected entries are read in parallel and analyzed (in parallel). It is to be noted that the guards $g_i$ usually differ with regard to their lengths, i.e. for the various comparisons, the bit string reduced by u is divided into different pairs $w_i$, $v'_i$. If no hit occurs (all g=w), transformation is aborted with page fault. In the case of exactly one hit $g_i=w_i$, the access attribute a is checked against the action x, and, if it is true, x, $p_i$ and $v'_i$ are passed to the next level and/or returned as a real address. In the case of several hits, the result is not defined. As can be shown, 8-associative guarded page tables enable an n-bit address transformation within a maximum of n/4 steps within a maximum of 2 (simple) entries per data page. Consequently, for 64-bit addresses, a maximum of 15 levels is required, for 32-bit addresses 7 levels, to obtain 16 byte pages.

Figure 4:
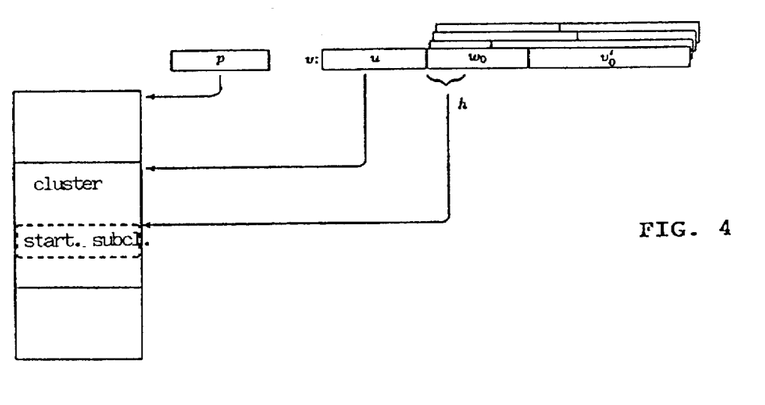

FIG. 4 illustrates an example for a transformation step of the method using k/j-associative guarded page tables. k/j-associative guarded page tables show the same semantics as k-associative ones. However, they require only k/j-fold parallelism for realization. For highest possible speed, we therefore only need k/j parallel units and parallel data paths for k/j entries. (In this case, k should be evenly divisible by j. In addition, these two should be powers of 2.) The clusters comprising k entries are divided into j subclusters (sub-regions) (which are contiguous and of equal size). If k>s holds for a page table, k is reduced to s for this transformation step. If s≦k/j, work is s-associative, otherwise it is s/j'-associative, j' being selected such that the length of the subclusters remains unchanged, i.e. k/j=s/j'. This will make no problems if s, k and i are powers of 2. To maintain the semantics of k-associativity, the transformation operation is performed sequentially (k/j-parallel) on different subclusters until a hit occurs or until all j subclusters are processed. If no hit is found, address transformation is aborted with page fault, in the case of a hit, the procedure is continued as described in connection with FIG. 3. Obviously, this method is only efficient if possible hits are often found at the very first attempt. To obtain a hint, after removing u, the highest $\log_2$ (k) bits of the remaining virtual address are taken as a hint (however, the hint bits are also used further for building $w_i$.) In the case of simple k/j-associative guarded page tables, one begins with the subcluster addressed by h/j. The further sequence can be determined by incrementing h/j modulo. Other sequences are equally possible, e.g. from 0 to j−1 with omission of h/j. They have nearly no influence on efficiency.

Figure 5:
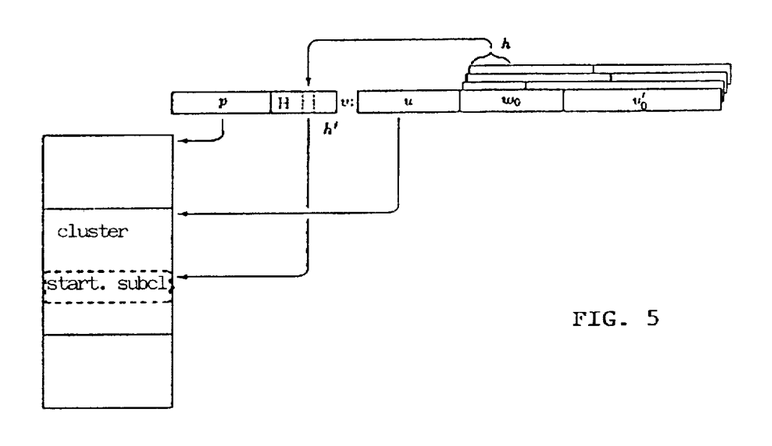

In the case of k/j-associative guarded page tables with hint, each p (in page table entries, in the root and in the TLBs) is expanded by a field H with k hint elements (this is relatively small with k $\log_2$ (j) bits.) One begins with the subcluster addressed by p.H[h]=h' in each step. If a hit is not achieved in the subcluster addressed by h', but in another subcluster of number h", the hint element is reloaded: p.H[h]:=h". Consequently, hints adjust automatically.

As is shown, 8/2-associative guarded page tables with hints allow address transformation within a maximum of n/4 steps for a maximum of 2 2/7 entries per data page. In general, they need the same time for this as 8-associative guarded page tables do, but they require only 4 parallel units instead of 8 and correspondingly narrower data paths.

To achieve a sufficiently fast address transformation, guarded page table translators have also to be supported by TLBs. The specific problems are as follows: different page sizes, larger working sets (more pages because of smaller granularity); deeper trees with huge address spaces (depth 15 for 60 bit address transformation), i.e. higher cost for TLB miss.

Figure 6:
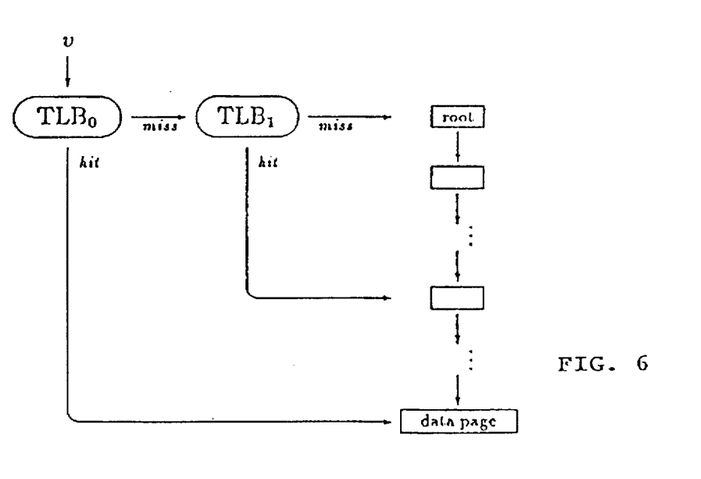

A multilevel TLB as illustrated in FIG. 6 is used for solution.

$TLB_0$ is a more or less conventional TLB on page basis or a virtual addressable cache; a hit delivers the corresponding real address directly. $TLB_1$ operates on larger regions (e.g. 16 MB) so that entering into the page table tree transversally is possible upon a near miss ($TLB_0$ miss and $TLB_1$ hit), and only a small part of the tree has to be parsed. If required, this method can be extended in a natural way by further $TLB_1$ levels.

The pages varying in size are an essential problem of the $TLB_0$ illustrated in FIG. 6. Wellknown solutions are a full-associative TLB (such as for MIPS R4000), which results in high circuit cost, or a virtual-addressed cache, which is faster than a real- addressed cache, yet has difficulties with synonyms and consistency problems with multiprocessors.

Figure 7:
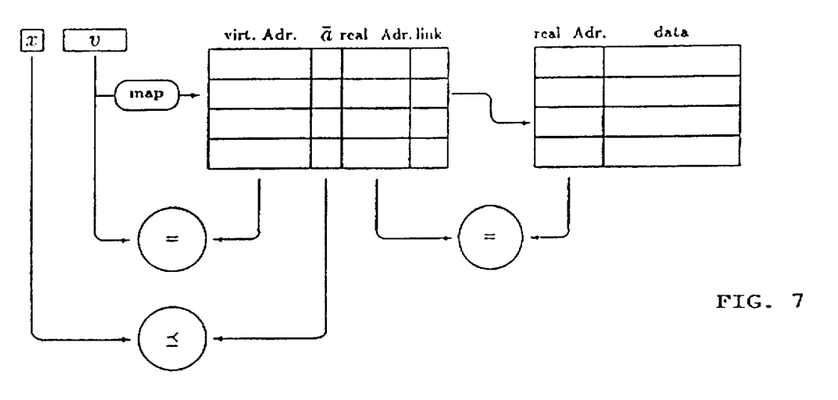

Another solution is a virtual- and real-addressable cache, which combines the advantages of a virtual-addressed cache (TLB for small pages, for many pages of varying size) with those of a real-addressed cache (synonyms are possible, suitable for multiprocessor systems). This is illustrated in FIG. 7. Here, field $\bar{a}$ contains the resulting access attribute which is obtained from the combination of the access attributes of the individual levels during address transformation.

Figure 8:
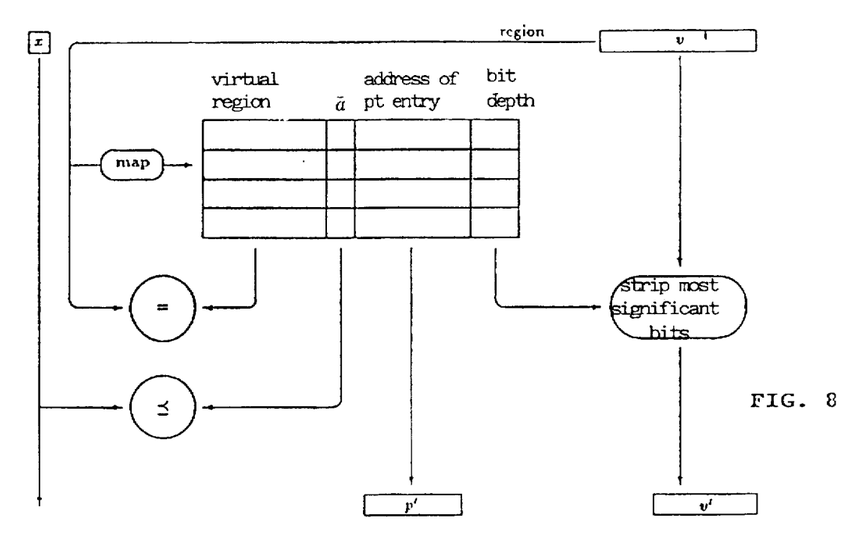

Just as for $TLB_0$, several solutions are possible for $TLB_i$ (and for higher levels). A specific cache (direct mapped or n-fold associative) can be used for the individual regions. It is addressed with the region (e.g. $v+2^{24}$) and delivers the next possible entrance to the page table tree in the case of a hit. This is the address of the corresponding page table entry and its depth, i.e. the number of leading bits of the virtual address which have already been decoded up to this entry (it is to be noted that the entry has not necessarily to be located on the "region depth", but it can also be positioned on a higher level due to the guards) and which therefore have to be removed from the virtual address v upon entering into the address transformation tree transversally. $\bar{a}$ contains the access attributes obtained by combining the page table access attributes during the address transformation up to the region. In the case of $TLB_i$ hit and admissible action (x≦ $\bar{a}$) the address transformation is performed step by step according to the method of the present invention. One begins with v' as a virtual address and p' as an address of a page table with only one entry (since $TLB_i$ does not deliver the page table, but supplies the corresponding page table entry).

In the case of TLB$_i$ miss, a complete address transformation according to the present method is performed. The best possible entrance to the region found in this way is then included in the TLB$_i$ cache.

Figure 9:
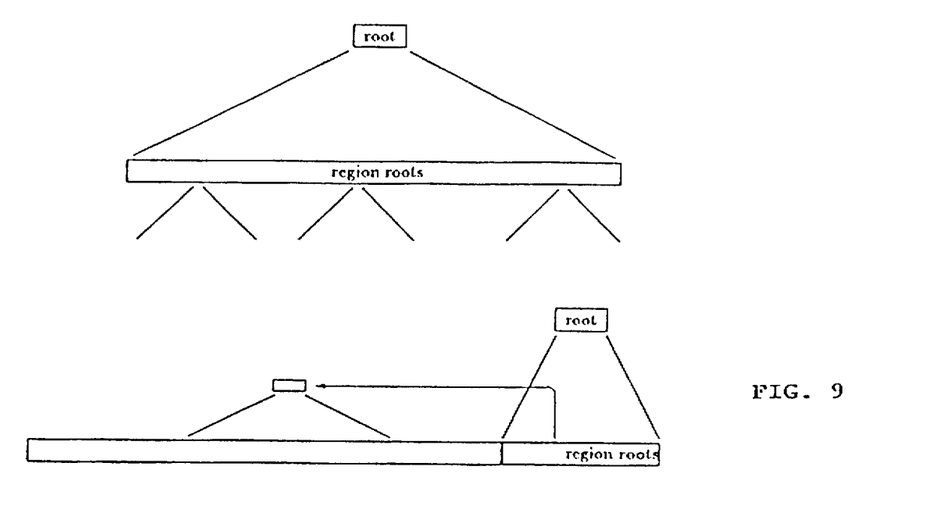

A further alternative to the TLB$_i$ of FIG. 6 is shown in the upper part of FIG. 9. When using a sufficiently large TLB$_0$ respectively a virtual-addressable data cache, one can do without a specific cache for TLB$_i$. One can use instead a two- (or more) level hierarchy of address transformation trees. If linearized, the address space is as shown in the lower part of FIG. 9.

A specific tree is used for each region. The roots of these trees are accessible via a specific area in the virtual address space ('region roots'). In the case of a TLB$_0$ miss, it is now attempted to address the corresponding regional tree via its virtual address in the area 'region roots'. If one succeeds by means of TLB$_0$ hit for the corresponding virtual region root address, one gets a TLB$_i$ hit. Subsequently, one needs only parse the (not very deep) regional tree. Otherwise, a complete address transformation of the virtual region root address is executed beginning with 'root', and the regional tree is parsed subsequently. This method requires less hardware, but, in the extreme case (only one page per region), it may require one additional page table entry per accessible page. If the smallest page is larger than a page table entry, the additional storage requirements may increase because of the fragmentation of the 'region root' area.

The following is to address a further feature which is particularly useful with fine grained mapping in huge address spaces that are sparsely occupied.

Fine grained mapping enables an access control on the level of logical storage objects, e.g. program variables. In this way, it can be used reasonably both in the area of classical imperative programming languages and in object oriented and declarative languages, in particular for distributed or massively parallel systems. Typical applications are as follows:

1. Aliasing

Mapping a virtual storage object onto another virtual storage object. This is used, for example, for object synthesis, but also for constructing alternative views or simply for parameter passing.

2. Call On Reference

Calling a user-defined procedure upon access. This is to associate specific access semantics to address space regions, for example, 'delay upon read access' (variable value has not yet been computed), 'signal upon write access', 'remote object invocation', 'access by proxies' or simply 'access protocol'.

Combining the two methods allows an efficient realization of distributed memories since access to potentially remote objects is feasible by means of local object invocation. Memory accesses are performed directly in the local case and algorithmically in the remote case.

Distinction is by hardware. On the functional level, the operating system (μ-Kernel) can realize all this by means of software. Since, however, mapping is likely to be modified very frequently with the mentioned methods, it is desirable to have a facility for modifying mapping directly within the user level program without using the operating system. This option should not affect the security paradigm of the operating system.

Figure 10:
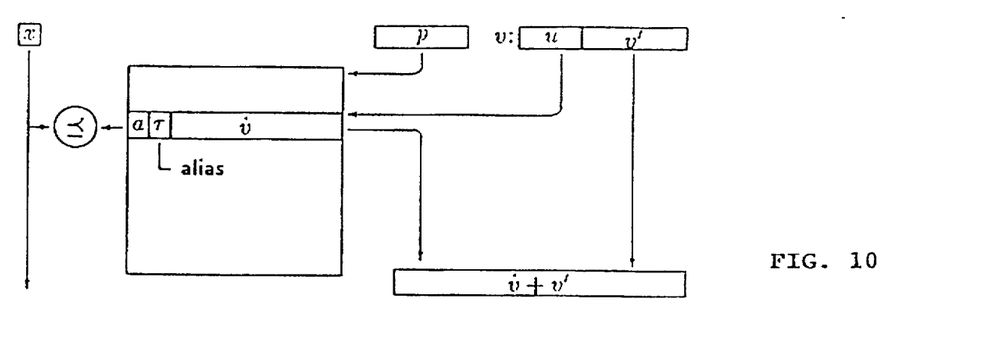

As already mentioned above, user level mapping is of special interest to an MMU admitting fine grained address spaces like presented in chapter 1. The method presented here can also be integrated into other MMUs showing fine or coarse grained mapping if they are based on the transformation of a virtual address into a real address by means of a page table tree. However, this is not imperative. Page Table entries consist conventionally of an access attribute a which defines the applicable actions on the address space region and a pointer $\pi$ which is the real address p of the next page table level or the data page in the case of normal address transformation. In addition, each page table entry has a type $\tau$ which determines a.o. the interpretation of the pointer $\pi$. The conventional entries are of type $\tau$=translate. For user level mapping, new types and special instructions are introduced for providing a secure modification of mapping. In the alias type, the pointer $\pi$ is interpreted as a virtual alias address $\overset{\cdot}{v}$. If address transformation meets an alias entry 2, whose access attribute a allows the access action x, on any level, $\overset{\cdot}{v}$ is added to the remaining address v' not decoded so far, or the new address is formed from $\overset{\cdot}{v}$ and v' in another way. This situation is shown in FIG. 10 for one transformation step.

Figure 11:
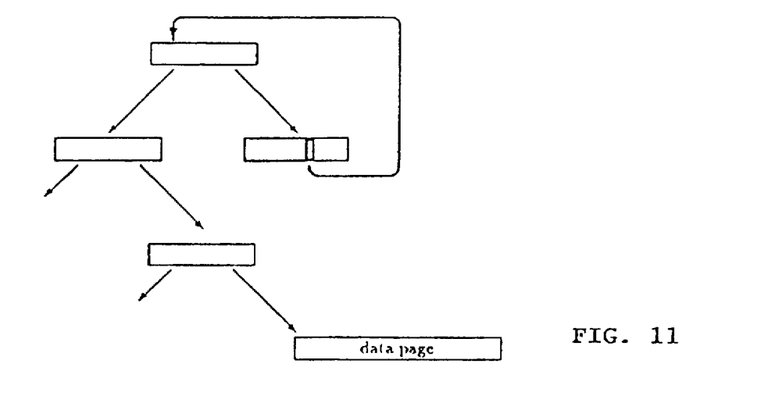
Figure 12:
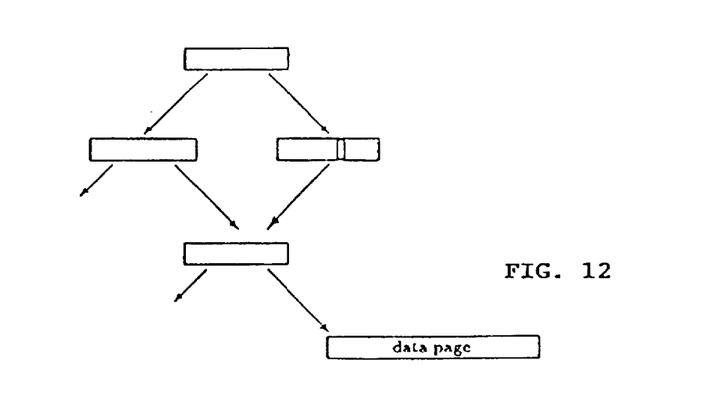

Address transformation is restarted with the resulting ($\overset{\cdot}{v}$+v', e.g.) which is a virtual address of full length. Consequently, the entire virtual region covered by the alias entry is mapped virtually to another virtual region (see the schematic tree structure in FIG. 11). This is to be distinguished from conventional real aliasing where several real pointers meet on a page table or data page. Conventional real aliasing is illustrated schematically in FIG. 12. Unlike real aliasing, virtual aliasing is independent of real memory mapping. In this way, it enables modifications of mapping by means of user level software independently of current real memory allocation and paging without being able to violate the protection boundaries of the own or foreign address spaces and without being able to weaken the access attributes preset by the operating system on pages or larger address space regions.

Figure 13:
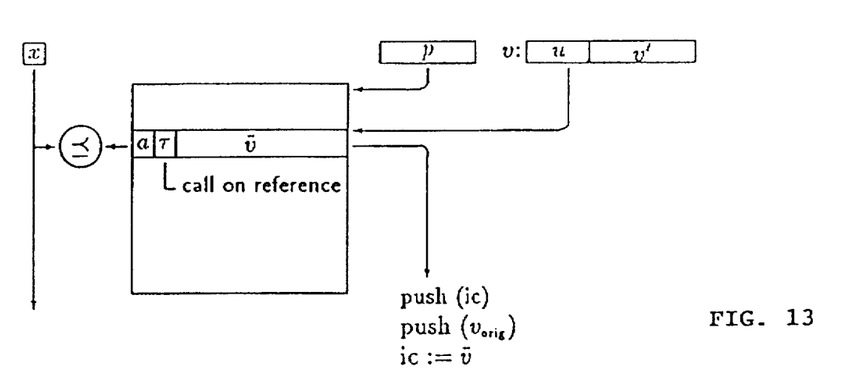

For the type $\tau$=call on reference, the pointer $\pi$ is interpreted as a virtual address $\overset{\cdot}{v}$ of a procedure. If address transformation encounters a call on reference entry, whose access attribute a allows the access action x, the accessing operation is aborted and the specified procedure is called instead. It gets the current instruction counter (ic) and the initiating virtual address $v_{orig}$ as input parameters. Just as with a page fault, the initiating instruction can be restarted. FIG. 13 shows a transformation step with the type $\tau$=call on reference.

Call on reference mapping assigns algorithms to address space regions. These can skip the initiating instruction, they can emulate or handle it in a similar way as with page fault, i.e. to remap the address space region in question by alias and to restart the instruction. Sometimes, skipping and emulation of individual instructions can be accelerated by special processor instructions (see below under the additional instructions "getmap", "getlength" and "execute").

Processors with strict load/store architecture allow to improve emulation by additional parameters besides ic and $V_{orig}$ passed to the associated procedure—upon write access—the 'write access' code, the operand size (byte, word, . . . ), and the operand value,—upon read access—the 'read access' code, the operand size (byte, word, . . . ), and the number (address) of the destination register. With processors with more complex instructions, the following additional parameters may be passed instead: operation (mov, add, inc, . . . ), operand size (byte, word, . . . ), source register/memory address, destination register/memory address.

The instruction set of the processor is extended by the non-privileged instruction map. This enables user level software to modify alias and call on reference entries directly. A page table entry is denoted unambiguously by the virtual address region it covers precisely in the primary address transformation (the reverse does not hold since an entry can be responsible for several virtual address space regions on account of real sharing). By primary address transformation, we here understand the translation process which transforms the original virtual address until a page fault is diagnosed, until an alias entry, a call on reference entry or an entry referring to a data page is found. The addressed entry is specified accordingly by the virtual base address b and size s of the corresponding address space region. The instruction $$\text{map} ((b, s), (\tau, \pi))$$

loads the addressed page table entry with $\tau$ and $\pi$, provided that $\tau$ is alias or call on reference (consequently, virtual-real mappings cannot be defined or modified) and the target entry exists (consequently, entries cannot be created secretly) and is accessible from the current mode (user/kernel) (consequently, the operating system can protect itself) and it is already of the alias or call on reference type. Overlaying a translate entry in the user part of the address space by alias or call on reference is not security-relevant, but it would lead to dead subtrees without the operating system noticing it. Otherwise, map will lead to page fault. By this, user level software can modify corresponding entries, i.e. switch between alias and call on reference and/or change the alias or the associated procedure address. However, this instruction cannot be used either for creating new entries or for modifying available virtual-real mappings or for weakening access attributes.

Creating and deleting corresponding entries together with the necessary modification of the page table tree should be realized by system calls in the operating system kernel. Alias and call on reference entries can be realized by the operating system as long-living objects, since swapped-out entries lead to page fault both upon normal access to the address space region and upon map access to the entry. Further processor instructions are not necessary, but they might be of interest for specific processors and applications:

$$\text{getmap} ((b, s), (\tau, a, \pi))$$

reads a page table entry, provided that it exists, is accessible from the current mode and is of the alias or call of reference type. Skipping and emulation by means of a procedure associated with the address space region might get more efficient by using instructions which return the length of another instruction or which can execute it with a modified memory address:

$$\text{getlength (dest, ptr)}$$

returns the length of the instruction which is located at the virtual address 'ptr' in 'dest'.

$$\text{execute (ptr, v)}$$

executes the instruction located at the virtual address 'ptr' using however the virtual address v instead of the memory address actually used in the instruction. For multi-address machines, more complex forms of the instruction might be necessary. Both instructions are not useful for processor architectures showing only a few and simple instruction formats and addressing modes. In principle, the entry types alias and call on reference are sufficient (in addition to translate). Combinations might also be of interest:

$$\tau\text{=call on write/alias on read}$$

$$\tau\text{=call on read/alias on write}$$

However, the page table entries must be enlarged in this case to include $\dot{v}$ and $\ddot{v}$ together, or $\dot{v}$ has to be the same for all these entries. Then the map instruction of course works on these two types, too.

For associating specific hardware actions with address space regions, e.g. activating complex bus protocols for access to a remote memory, further (special) types can be used for $\tau$.

Figure 14:
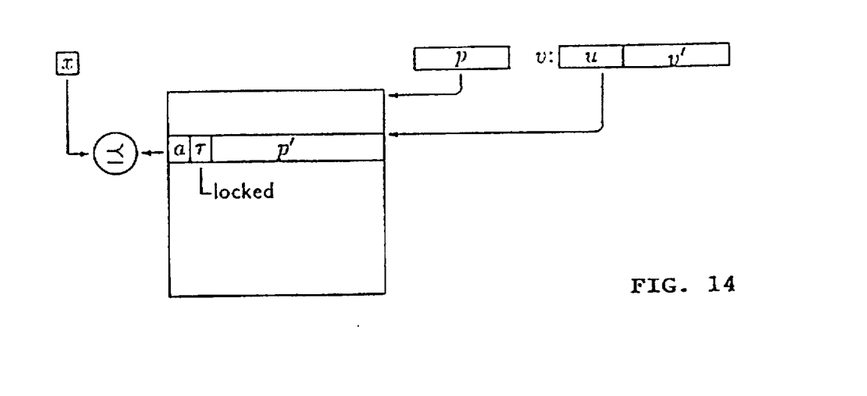

For multiprocessor machines with shared memory, an address space region should sometimes be locked so that accesses to it by other processors are delayed automatically until release. Of course, at least one processor should be able to access. This is done by virtual or real aliasing. Locking can be done by associating an empty routine to the address space region, i.e. by using a call on reference page table entry pointing directly to a ret instruction. Unlocking is done by modifying the mapping to alias. For some architectures, a specific new type $\tau$=locked may be useful, since, in some cases, it can be implemented somewhat more efficiently since it allows lock/unlock without reinterpretations in cache and TLB. This situation is represented in FIG. 14. If address transformation encounters such an entry, it is restarted completely. Only if another processor sets the entry to translate again or modifies the page table tree in such a way that the entry is no longer involved, the delay is terminated. Locked entries differ only in the type from translate entries. Changes between the two therefore only require a consistent modification of the types of the corresponding cache and the TLB entries (for larger objects, a TLB flush is probably more efficient), but no modification of the virtual→real mapping. Two further instructions are used for changing between locked and translate:

$$\text{lock (b, s) unlock (b,s)}$$

lock sets the addressed page table entry to locked and unlock sets it again to translate, provided that the target entry exists and is accessible from the current mode (user/kernel) and is already of the type translate or locked. In all other cases, page fault will be triggered.

Encoding the above instructions and/or bit strings or sequences of flexible length (including guards), the following possibilities are available, for example.

Pairs (b, s) of n-bit-wide base address b and size $s=2^i$ can be coded as n-bit-value $$b + \frac{s}{2}$$

for $s \geq 2$ if the base address is always s-aligned, i.e. b mod s=0. Then the bit representation looks as follows:

The method can be used for coding bit strings of variable length up to maximum n−1 as well, e.g., guards of Guarded Page Tables can be coded by this. A bit string b of length ‖b‖ is represented by the n-bit-number In both cases, the decoding hardware takes the lowest 1-bit as delimiter to the bit string (or the base address) b. Of course, the roles of 1-bit and 0-bits can be exchanged or the higher bits can be used for the length coding.

```
bb............bb011...11
```

```
00.....001bb...........bb
```

Figure 15:
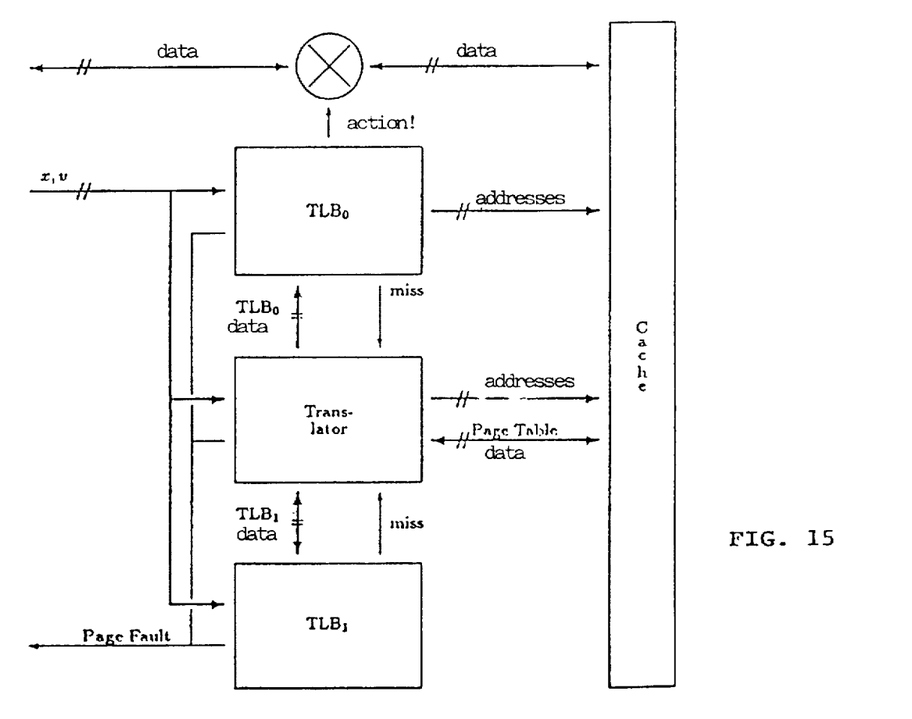
Figure 16:
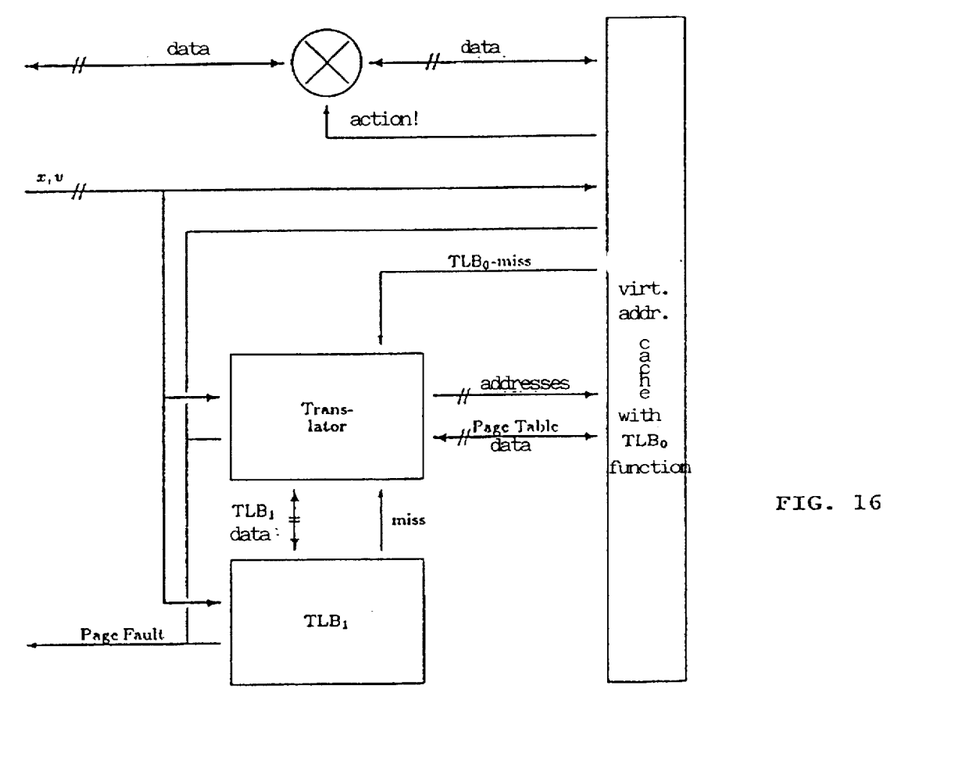
Figure 17:
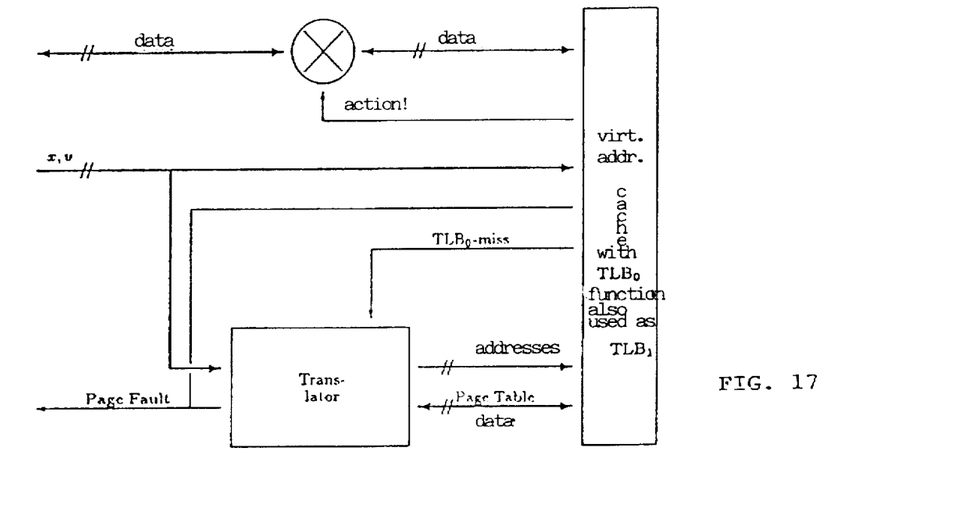

With reference to FIGS. 15 to 17, the following is a short description of possible hardware realizations of a translator of a MMU operating according to the present invention.

According to FIG. 15, the $TLB_0$ and the TLB are provided as independent hardware. Instead of the cache (see right hand part of FIG. 15), one could of course directly connect a conventional memory. If a virtual addressable cache is used, this may take the functions of the $TLB_0$, as illustrated in FIG. 16. The block diagram is still simpler, if the TLB is realised by the translator by means of the Cache+$TLB_0$, as described before in connection with FIG. 9. This will result in the block diagram of FIG. 19.

I claim:

1. A method for mapping a first bitstring of a first length onto a second bitstring of a second length, in particular for transforming a virtual memory address of a virtual memory into a real address of a real memory, wherein a) a first memory region with a first starting address (p) and a first length is preset, b) it is checked whether the length of said first memory region is shorter than or equal to 2 to the power of the length of the first bitstring (v) and, if this is the case, the sum of the first starting address (p) of the first memory region and of the first bitstring (v) gives the second bitstring (data page reached), and if said check is negative, the first memory region is used as a first table, and c) bits (u) are selected from specific locations of the first bitstring (v), the unselected remaining bits forming a residual bitstring (w, v'), d) the selected bits (u) of the first bitstring (v) specify an entry of the first table, e) this entry is read out from the first table, f) the starting address (p') and the length of a further memory region and a guard bit sequence (g) comprising a number of bits are derived from the read-out table entry, g) a number of bits is selected from the residual bitstring (w, v'), the number being equal to the number of bits of the bit sequence (g) derived from the table entry of the first table, h) it is checked, whether the sequence of the selected bits of the residual bitstring (w, v') is equal to the bit sequence (g) derived from the table entry of the first table, i) in the case of the check results being negative, a fault signal is generated which indicates that the mapping is not defined for the first bitstring (v), k) the bitstring (g) is removed from the residual bitstring (w, v') if the above check is positive, and l) the method is repeated from step b) using the non-removed remaining part (v') of the residual bitstring (w, v') as the first bitstring (v) and the starting address (p') and the length of the further memory region as the starting address (p) and the length of the first memory region.

2. The method of claim 1, characterised in that the bits selected in step c) are the leading bits (u) of the first bitstring (v).

3. The method of claim 1, characterised in that it is checked in step f) whether the residual bitstring (w, v') of the non-selected bits of the first bitstring (v) has as its head (w) the bit sequence (g) derived from the table entry of the first table, and that in step k) the head (w) identical with said bit sequence is removed from the residual bitstring (w, v'), if the result of the check in step h) is positive.

4. The method of claim 1, characterised in that prior to step g), the residual bitstring (w, v') is permutated according to a first permutation rule, and that after step k) and prior to step l), the remaining part of the permutated residual bitstring (w, v') is permutated according to a second permutation rule before the process is carried on with step b).

5. The method of claim 1, characterised in that in step d), the selected bits of the first bitstring specify a table region (cluster) of a first table, in step e), the entries of the region of the first table thus addressed are read out, in step f), the starting addresses ($p_i'$) and lengths of a plurality of possibly different further memory regions and a plurality of bit sequences ($g_i$) with possibly different bit lenghts are derived from the read-out entries of the initially addressed region of the first table, a starting address ($p_i'$) and a length of a further memory region being attributed to each bit sequence ($g_i$), the steps g) and h) are carried out in particular in parallel or sequentially for all read-out bit sequences ($g_i$), if all checks in step h) are negative, a fault signal is generated, indicating that the mapping for the first bitstring (v) is not defined, and otherwise, the bit sequence ($g_i$) or one of the bit sequences ($g_i$) for which the check in step h) is positive is removed from the residual bitstring (w, v') and the associated starting address and length are taken as the starting address ($p_i$) and length of the further memory region.

6. The method of claim 5, characterised in that the region (cluster) of the first table is subdivided into a plurality of subregions (subclusters), each of which contains at least one entry consisting of a starting address, a length and a further bit sequence, a hint address (h) is set, and the entries of the subregion initially addressed by the hint address (h) are read out first from the region of the first table initially addressed by the selected bits of the first bitstring.

7. The method of claim 1, characterised in that the first bitstring (v) is successively supplied to at least one mapping means ($TLB_1$) in which mappings of the first bitstring (v) to starting addresses (p), as well as lengths of memory regions and shortening values are stored, and in the case of a mapping of the first bitstring (v) not being stored in the at least one mapping means ($TLB_i$), the procedure is started with step a) applied to the first bitstring (v) to be mapped, while otherwise the procedure starts with step b) using as the first table the memory region that is specified by the starting address and length obtained from the at lest one mapping means (TLB$_1$), and using as the new first bitstring the first bitstring shortened by the shortening value, the shortening being a separation of the leading bits, in particular.

8. The method according to claim 1, wherein
the first bitstring is transformed into the second bitstring in accordance with a transformation method comprising the following steps:
   defining a table with at least one table entry,
   selecting bits from specified locations on an input bitstring, the unselected remaining bits forming a residual bitstring,
   specifying a table entry by the selected bits of the input bitstring,
   reading out this entry of the first table,
   carrying out the following partial steps, if the read-out table entry is of the ALIAS type:
      removing an alias bitstring from the table entry,
      combining the alias bitstring and the residual bitstring into an output bit string,
      restarting the entire transformation procedure from the beginning, using the output bitstring as the new first bitstring.

9. The method according to claim 1, wherein
the first bitstring is transformed into the second bitstring in accordance with a transformation method comprising the following steps:
   defining a table with at least one table entry,
   selecting bits from specified locations on an input bitstring, the unselected remaining bits forming a residual bitstring,
   specifying a table entry by the selected bits of the input bitstring,
   reading out this entry of the first table,
   carrying out the following partial steps, if the read-out table entry is of the SIGNAL type:
      removing an auxiliary bitstring from the table entry,
      cancelling the entire transformation procedure, and
      generating a signal containing at least the auxiliary bitstring.

10. The method of claim 9, characterised in that on account of the signal, a procedure is called at the address specified by the auxiliary bitstring.

11. The method according to claim 1, wherein
the first bitstring is transformed into the second bitstring in accordance with a transformation method comprising the following steps:
   defining a table with at least one table entry,
   selecting bits from specified locations on an input bitstring, the unselected remaining bits forming a residual bitstring,
   specifying a table entry by the selected bits of the input bitstring,
   reading out this entry of the first table,
   restarting the entire transformation method from the beginning, if the read-out table entry is of the LOCKED type.

* * * * *